March 17, 1942.    R. B. VELYKIS    2,276,356
CATALYTIC REACTOR
Filed Nov. 26, 1938
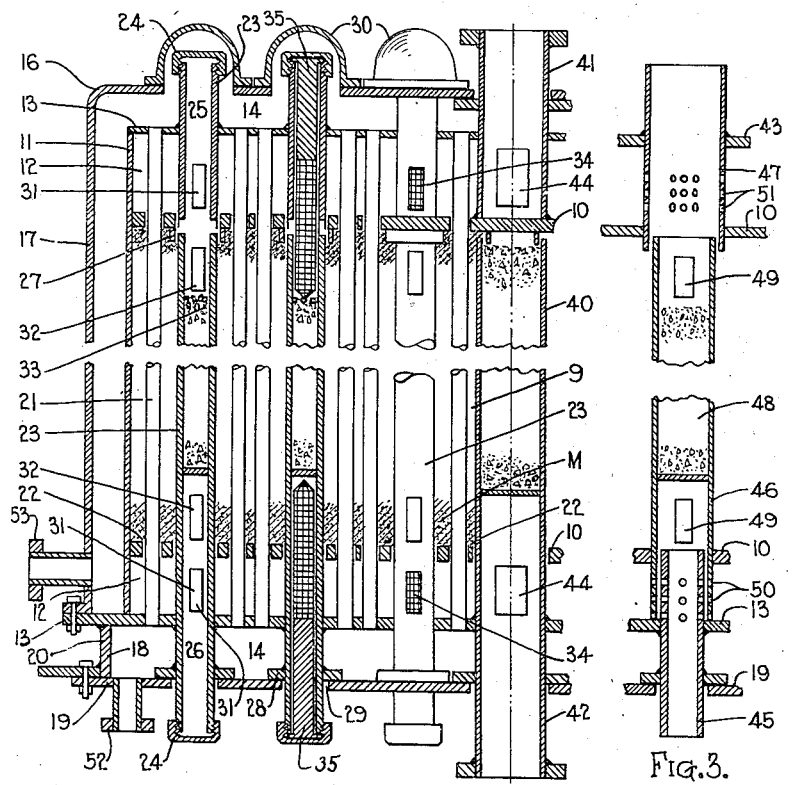
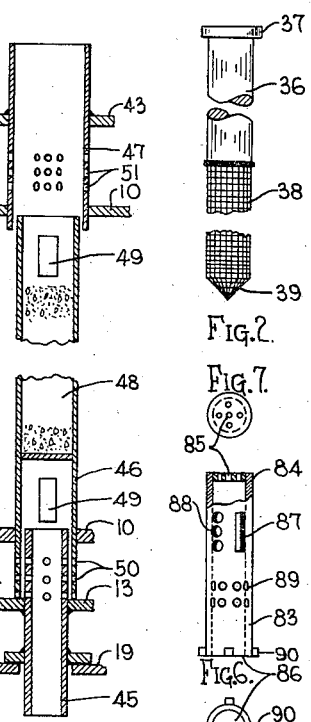
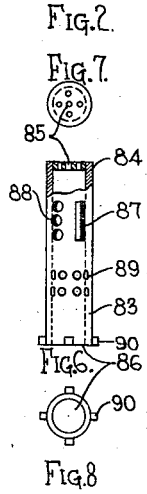
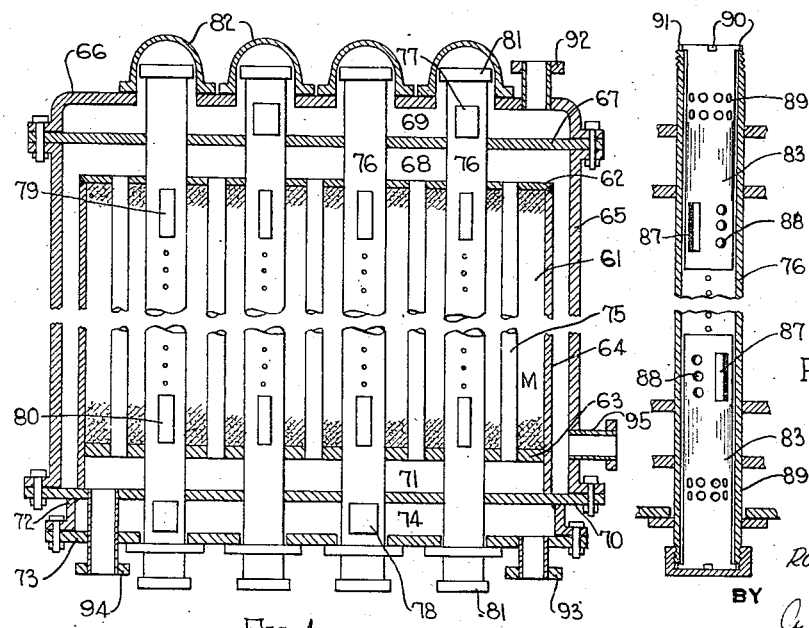
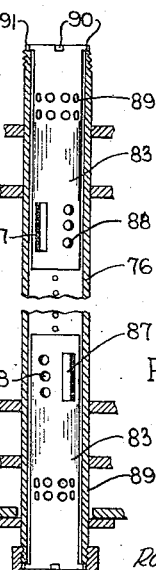
INVENTOR
Robert B. Velykis.
BY
Ira L. Nickerson
ATTORNEY Patented Mar. 17, 1942

2,276,356

UNITED STATES PATENT OFFICE 2,276,356

CATALYTIC REACTOR

Robert B. Velykis, Paulsboro, N. J., assignor, by mesne assignments, to Houdry Process Corporation, Wilmington, Del., a corporation of Delaware Application November 26, 1938, Serial No. 242,454

7 Claims. (Cl. 23—288)

This invention relates to converters and to methods of controlling reactions for effecting physical or chemical changes. It is especially concerned with the modification, conversion, transformation or other treatment of fluids in the presence of contact materials which may promote, enter into or in any way affect the reaction. It is also directed to novel features of construction of apparatus which affords increased efficiency in operation.

Among the objects of the invention are: to provide improved ways and means for effecting and controlling chemical reactions; to provide a novel arrangement for expeditiously supplying to and/or removing from a reaction chamber materials used in or resulting from such reactions; to construct an apparatus which may be readily assembled and disassembled; to provide for relative changes in the apparatus parts in accordance with temperature differences; to design a converter which permits accurate control of the temperature of the converter walls and reaction chamber; to construct a converter with a plurality of fluid sealed manifolds at each end which may be used interchangeably for heat exchange fluid or reactant fluid; to provide a material supplying and removing device which is readily accessible from the exterior of the converter and to provide inserts for the material supplying and removing device which may be used to selectively control the passage of materials.

The invention contemplates a converter having a reaction chamber for contact material and, at each of its ends, an inner and outer manifold which manifolds are arranged to cooperate in inner and outer pairs. To this end one pair of the manifolds is joined in communicating relationship by conduits which extend through the reaction chamber and are sealed therefrom for passing heat exchange fluid between the manifolds in indirect heat exchange relation with the contact material while the other pair of manifolds is provided with conduits which are in communication with the reaction chamber as well as the other pair of manifolds for passing reaction fluid or products of reaction between the manifolds and reaction chamber. The conduits which are in communication with the reaction chamber also extend outwardly of the converter end walls to permit access to the conduits from the exterior of the converter, thereby providing an arrangement for charging and discharging contact material to and from the reaction chamber. Either pair of cooperating manifolds may be used for the heat exchange fluid, while the remaining pair will be used for reactants and reaction products. If the inner manifolds are used for the heat exchange fluid, the heat exchange conduits will be secured directly to end walls of the reaction chamber and the fluid will be supplied to a manifold in a manner to contact the exterior surface of one end wall of the reaction chamber and will pass through the chamber in heat exchange relation with the material therein and outwardly of the chamber in contact with the exterior surface of the other end and side walls of the chamber to maintain the walls of the reaction chamber substantially at the temperature of the contact material. When the outer manifolds are used for the heat exchange fluid, the heat exchange conduits will be secured to the outer walls of the inner manifolds and the heat exchange fluid circulated to maintain the exterior of these and the side walls of the manifolds and reaction chamber at substantially the temperature of the contact material.

The conduits which extend through the end walls of the converter are provided with spaced apertures in the portions thereof which are disposed within the reaction chamber and also with apertures in portion or portions which are disposed within the reactant and/or reaction products manifolds and these apertures cooperate to pass fluid between the reaction chamber and manifolds when a reaction is being carried out. When it is desired to charge contact material to or discharge contact material from the reaction chamber the apertures in the manifold areas of these conduits are closed or sufficiently closed to prevent the contact material from entering the manifolds from the conduits. The portion of the conduits in the reaction chamber, in one form of the invention, is blocked off adjacent the inner ends of the apertures in order to prevent passage of fluid or contact material through the conduits while the apertures cooperate to provide a straight through type of flow through the contact material. In another form of the invention perforations are provided in the conduits between the apertures within the reaction chamber to permit fluid to pass in parallel between the conduits so as to provide separate sets of distributor and collector conduits. In order to prevent the contact material from entering the conduits through the apertures from the reaction chamber when a reaction is taking place, and at the same time permit reactants and reaction products to pass between the reaction chamber and manifolds, inserts are provided for the conduits which have areas of sufficiently small perforations to exclude the contact material and which coincide with the slotted areas of the conduits to permit the passage of fluid.

In order to illustrate the invention, concrete embodiments thereof are shown in the accompanying drawing in which:

Fig. 1 is a vertical sectional view of something more than one half of one form of assembled converter with portions sectioned to show details of the invention, Fig. 2 is an enlarged detail of the tube insert shown in Fig. 1, Fig. 3 is a sectional view of a modification of the material supplying and removing conduits shown in Fig. 1, Fig. 4 is a vertical sectional view of a modified form of assembled converter, Fig. 5 is a sectional view of the material supplying and removing conduits of Fig. 4, showing inserts in place.

Figs. 6, 7, 8 are an elevation, top and bottom plan views, respectively, of the tube insert shown in Fig. 5.

Referring to the drawing wherein similar parts will be indicated by like numerals, in Fig. 1 the numeral 9 generally indicates a reaction chamber adapted to contain a contact mass M which may be any form of solid contact material capable of promoting or in any way entering into the reaction. For certain reactions, such as those involving the transformation, conversion or other treatment of hydrocarbons derived from deposits of petroleum, coal, lignite, shale, etc. the solid contact material may be silicious in character and of natural or artificial origin and may include blends or compounds of silica and alumina with or without the addition of small amounts of other active components, such as metals or metallic compounds, the contact mass being made up in the form of bits, fragments or molded pieces to facilitate regeneration. The reaction chamber is provided with end walls 10 and a side wall 11 extending beyond the end walls and forming inner fluid manifolds 12, 12 at the top and bottom respectively of the reaction chamber having outer transverse walls 13. Outer fluid manifolds 14 are provided adjacent the inner manifolds and, as shown, the upper manifold 14 is formed by means of an outer shell having a top 16 and side wall 17 which is detachably secured to the lower transverse wall 13 by suitable bolts. The lower manifold 14 is formed by means of a plate ring 18 secured to the underside of the lower transverse wall 13 and a removable bottom cover plate 19 which is detachably secured to a supporting ring 20. Imperforate heat exchange conduits 21 extend through the reaction chamber and the inner manifolds 12 and the ends thereof are secured in a fluid tight manner, preferably by being rolled, into the end walls 13 thereof. The end walls 10 of the reaction chamber are provided with a plurality of apertures 22 to receive the heat exchange tubes and the apertures are sufficiently small to retain the contact material within the reaction chamber but large enough to permit a substantial amount of fluid to pass between the inner manifolds and the reaction chamber. A second set of conduits 23 extends through the reaction chamber and both inner and outer manifolds and the conduits are provided with removable screw caps 24, 24 at their ends which permit ready access to the interior of the conduits. The conduits 23 may be unitary or, as shown in Fig. 1, they may be constructed in two sections or as separate conduits, each of which extends to a point adjacent the upper reaction chamber end wall 10 to provide therewith an expansion joint which is formed by extending the upper sections 25 of the conduits into apertures in the upper end wall 10 in sliding engagement therewith, while the free ends of the lower sections 26 terminate short of the end wall 10 and are received in ferrules 27 which exclude contact material from the conduits and yet permit the sections to expand or contract in accordance with temperature conditions. The tube sections 25 and 26 are secured to the converter end walls 13—13 and are movable relative to partitions 10—10. The lower sections 26 are provided with flanges 28 which are disposed above and in generally sealing engagement with apertures 29, formed in the removable bottom cover plate 19, for receiving the ends of the lower conduit sections. The top 16 of the outer shell is provided with removable bonnets 30 which receive the outer ends of the upper conduit sections 25 to permit access separately to each conduit.

The conduits 23 are provided with slots 31 in the portions thereof which are disposed in the inner fluid manifolds and also with additional slots 32 in the portions which are disposed in the reaction chamber which cooperate in passing fluid between the reaction chamber and manifolds. The portion of the conduits in the reaction chamber between the upper and lower slots 32 is blocked, as indicated, with a concrete mixture 33, in order to prevent the passage of any material through this portion of the conduit and, as indicated, the blocking material extends to points adjacent the inner ends of slots 32 so that any material entering the conduits will be diverted from the conduits through the slots and into the reaction chamber. In order to supply to or remove contact material from the reaction chamber, the slots 31 within the manifold areas may be temporarily closed or, as shown at the right side of Fig. 1, provided with screens 34 to prevent the contact material from entering the manifolds 12 but which will permit the passage of fluid therethrough. Closing these slots or providing screens is particularly essential when the contact material is of the size specified in Patent No. 2,078,951 issued to E. J. Houdry on May 4, 1937, wherein a molded material having 1 mm. penetration depth is used for the reactions. The reaction chamber may be readily supplied with contact material by the sections 25 up to the lower ends of upper slots 32 and the chamber completely filled according to the invention disclosed in Patent No. 2,079,630 issued to T. B. Prickett et al., May 11, 1937, wherein is shown an arrangement for feeding the material through a conduit into the chamber and spreading the same by an air blast. The feeding conduit and air jet disclosed in this patent can be inserted into the chamber through openings which are not shown, but may be provided in the side wall 11 at points adjacent the top end wall 10. In order to retain the contact material within the reaction chamber after it is filled, inserts 35 are provided as shown in Fig. 1 which extend into the sections 25 and 26 of the conduits to a point inwardly of the slots 32. As best shown in Fig. 2, the inserts comprise solid plugs 36 having flanges 37 at their outer ends which seat on the ends of the conduit sections and are held in place under pressure of the caps 24. At the other end of the plug 36 a cylindrical screen 38 is welded or otherwise secured and is of sufficient length to cover the adjacent slotted areas 31 and 32 and also terminates in a pointed end portion 39 to permit its being drilled through any contact material remaining in the conduits after the reaction chamber has been filled. If desired the plug and screen assembly may have the cap formed integral therewith to eliminate the necessity of providing a flange.

Reactants may be fed to one of the inner manifolds 12 through one end of an enlarged central conduit 40 which extends through the converter and products of reaction withdrawn therefrom through the other end from the inner manifold 12. The conduit is constructed in two sections 41 and 42, similarly to the conduits 23, which sections are arranged relative to the upper reaction chamber wall 10 to permit expansion and the sections are constructed with slots 44, 44 to provide communication with the inner manifolds 12. The portion within the reaction chamber is blocked off to prevent the passage of fluid therethrough and also to prevent communication between the conduit sections and the reaction chamber. The blocking material for this conduit may also be a concrete mixture and the blocked portions of all the conduits within the reaction chamber are made of suitable extent to proportion the amount of contact material in accordance with the heat exchange surface for effecting proper control of the reaction, and also for diverting fluid from the tubes through one of the apertures to be diffused into the mass for passage to the other aperture longitudinally of the conduits in what may be considered a theoretical arcuate path to the other aperture.

Reactants which are fed to one of the inner manifolds 12 pass therefrom into the conduits 23 through the apertured openings 31 communicating with the manifold and are diverted into the reaction chamber through the slots 32 for distribution longitudinally of the conduits through the contact material and the products of reaction picked up or collected by the other slots 32 within the reaction chamber are carried to the other inner manifold 12 through the other slots 31 in communication therewith. Heat exchange fluid is supplied in a manner to maintain the temperature of the contact material and the exterior walls of the reaction chamber and inner fluid manifolds at substantially the same temperature during a reaction. Preferably the heat exchange medium will be admitted under pressure through the connection 52 to the bottom outer manifold 14 in heat exchange relation with the exterior of the wall 13 for passage through the tubes in indirect heat exchange relation with the contact material then outwardly of the tubes in direct contact with the upper wall 13 and then passed over the side wall 11 and outwardly through the connection 53 where it may be sent to a heat exchanger for conditioning before being returned to the lower manifold 14 for recirculation. The heat exchange fluid used to control the temperature may be gaseous or liquid, single phase or two phase, under low or high pressure. Single phase fluids which do not or are not permitted to vaporize under the conditions of operation include fused salts and certain metals and metal alloys. Two phase fluids such as water, mercury, diphenyl, etc. may be used when very large amounts of heat are to be supplied or removed.

In Fig. 3 a modified form of conduit is shown for supplying and removing material from the reaction chamber 9, and is made up of three sections 45, 46 and 47. This conduit is arranged to be readily removed from the converter and the lower and upper sections 45 and 47 are secured to the manifold walls in a manner similar to sections 26 and 25, respectively, of the conduits 23 of Fig. 1. The middle of section 46 is provided with the dummy portion 48 and slots 49, 49 which are disposed within the reaction chamber. This section telescopes the upper end of section 45 and is held by the transverse walls 13. Coinciding perforations 50 are provided in sections 45 and 46 in the portions disposed within the bottom inner manifold 12 and the upper section 47 is likewise provided with perforated areas 51 in the portions disposed within the top inner manifold 12 for preventing the passage of contact material into the manifolds when supplying or removing contact material to or from the reaction chamber and also for permitting the passage of fluid between the manifolds and reaction chamber when a reaction is being carried out.

In Fig. 4 of the drawing a modified form of converter is shown having a reaction chamber 61, which contains a contact mass M, and is provided with top and bottom headers 62 and 63 respectively, and a side wall 64. The reaction chamber is enclosed by a side wall 65 which is flanged at its top and bottom and receives a removable top portion 66 which is also provided with flanges for detachably securing the parts together by suitable bolts. Disposed between the cover 66 and the side wall of the casing is a transverse plate 67 providing an inner manifold 68 and an outer manifold 69 at the upper end of the casing. A lower transverse plate 70 is detachably secured to the bottom flange of the side wall 65 by suitable bolts and is spaced from the lower wall 63 of the reaction chamber, and, with extensions on the reaction chamber side wall 64, forms therewith a bottom inner manifold 71. A plate ring 72 is rigidly secured to the bottom plate 70 as by welding and is provided with flanges to receive a bottom end wall 73 which is spaced from the transverse plate 70 and forming therewith a bottom outer fluid manifolding chamber 74. Heat exchange fluid tubes 75 are secured to the top and bottom headers of the reaction chamber and are maintained in fluid-tight engagement therewith preferably by rolling the ends of the tubes into the headers. A second set of conduits 76 extends through the reaction chamber and all of the manifolds and these conduits are provided with apertures for communicating with one or the others of the outer manifolds 69 and 74 and with other apertures in communication with the reaction chamber. One group of conduits 76 is arranged to distribute reaction fluid for passage through the contact material in parallel flow, while the other group is arranged to collect the products of reaction and all of these conduits may be provided with expansion joints to permit expansion or contraction according to differences in temperature with the other parts of the converter or they may be directly associated with the heat exchange tubes 75 in order to be maintained at substantially the same temperature as the tubes. In order to provide for parallel flow, one group of conduits will have a slotted portion 77 in the outer manifolds 69 while the other group of conduits will have a slotted portion 78 in the other outer manifolds 74. All of the conduits in the portion disposed within the reaction chamber are, as shown, provided with slots 79 and 80 adjacent the top and bottom headers 62 and 63, respectively, and perforated portions between the slots. Removable caps 81 are provided at the top and bottom of each of the conduits permitting access thereto from the exterior of the converter. As shown, the casing top is provided with removable bonnets 82, giving access to the conduits separately. The slotted portions 79 and 80 are provided primarily for charging and discharging contact material to and from the reaction chamber through the open ends of the conduits, and in order to prevent the contact material from passing directly through the conduits when supplying material at the top thereof and also in order to maintain the contact material within the reaction chamber when a reaction is being carried out, removable inserts 83 are provided. In Figs. 6, 7 and 8 the insert is shown in detail and comprises a tubular member having one end 84 provided with perforations 85 which permit the passage of fluid but prevent the passage of contact material and its other end 86 is open to receive contact material. The body of the plug is provided, adjacent the perforated end, with co-extending slotted and perforated areas 87 and 88, respectively, while adjacent the other end perforated areas 89 are provided which may extend entirely around the body. Fig. 5 shows one of the conduits 76 provided with inserts 83 in its top and bottom ends and, as shown at the top of the figure, the end 86 is provided with lugs 90 which are received in recess 91, provided at the ends of the conduits for maintaining the plugs in any selected position. The inserts 83 are adapted to be positioned in the conduits so that when contact material is being supplied to the reaction chamber the slot 87 will coincide with the slots 79 in the conduits and the perforated end 84 will prevent the contact material from passing through the conduit and the coinciding slots will permit the material to pass into the reaction chamber. When the chamber is filled with contact material the inserts may be raised to remove the lugs from the recesses to allow them to be repositioned so that the perforations 88 of the inserts will coincide with the slotted areas 79 and the bottom inserts will be similarly placed relative to the conduits so that the perforations 88 coincide with the slots 80 of the conduits in order to provide the conduits with perforations only between the headers 62 and 63 when a reaction is being carried out. The apertured areas 89 of the plugs are provided to prevent contact material from entering the outer manifolds when supplying or discharging the material and also to permit fluid to pass between the reaction chamber and these manifolds. The apertured areas 89 preferably extend around the body of the insert in order that some perforations will always coincide with slotted areas 77 and 78 regardless of the position of the inserts.

The reactants may be supplied to either of the outer manifolds, as for example through the connection 92 to the manifold 69 and the products of reaction carried to the other manifold 74 to be discharged through connection 93. The heat exchange fluid will be supplied to one of the inner manifolds, preferably through the connection 94 in direct contact with the lower header 63 for passage through the heat exchange tubes and over and in direct contact with the exterior surface of the upper header and side walls 62 and 64, respectively, of the reaction chamber for maintaining the walls at substantially the same temperatures as the contact material within the reaction chamber, the heat exchange fluid leaving by connection 95. Conversely the heat exchange fluid may be passed in the opposite direction, as first over the exterior of the reaction chamber by admitting it by connection 95, then through the heat exchange tubes 75 embedded in the mass and discharging it into lower inner manifold and out through connection 94.

In both embodiments of the invention it will be seen that the lower transverse walls 13 and 70 of Figs. 1 and 4, respectively, carry practically the entire weight of the converter parts and consequently must be of substantial thickness which allows the side walls 11 and 64 respectively of the reaction chambers to be constructed of relatively light metal of the same thickness, or substantially the same, as the thickness of the heat exchange tubes in order to permit practically the same rate of expansion and hence minimize buckling or fracturing of these parts since they will be maintained at substantially the same temperature by the heat exchange medium in its circulation through the tubes and over and in contact with the exterior of the side walls. By providing the reactant conduits with expansion means as disclosed, it will be seen that adequate provision has been made for the relative movements of the various converter parts. This is essential particularly where the converters are used to control strong exothermic and endothermic reactions in alternation. For example, in the conversion of heavy hydrocarbons into lighter hydrocarbons, as in the catalytic conversion of petroleum and its distillates and derivatives into marketable products, especially low boiling ones, such as benzine, gasoline, naphtha, kerosene, etc. when such reactions are effected at a temperature in the range of 775° F. to 900° F., and in the regeneration of the catalyst in place when it becomes impaired through the deposit of contaminants thereon and is restored to its initial activity by the controlled oxidation or burning of the contaminants at the same or higher temperatures ranging up to about 1050° F.

The invention in its broad and narrow aspects has a wide range of utility in the fields of physical and chemical treatment of organic or inorganic fluids. Typical processes in which the invention is useful include: transformation or refining or other treatment of high or low boiling hydrocarbons to produce motor fuels, fuel oils, lubricating oils and other valuable products; hydrogenation of carbon monoxide, of hydrocarbons and/or of their derivatives; the purification of gases by contact masses having selective adsorptive properties and/or the removal of impurities by chemical action; selective oxidation of hydrocarbons and/or their derivatives to produce organic acids or related compounds; synthesis of ammonia; the catalytic combustion of partially formed flue gases and the like; and oxidation of sulphur dioxide to produce sulphuric acid anhydride and other processes readily recognized by those skilled in the art.

While the invention has been disclosed in several preferred forms, it is to be understood that they are only exemplary of the invention and not as in any way limiting the invention, which may cover all changes and modifications within the scope of the appended claims.

What I claim is:

1. A converter having side and end walls forming an enclosure and partitions extending across the converter providing a reaction chamber disposed between fluid manifolding chambers, a plurality of conduits extending through the partitions and across the reaction chamber each conduit having apertured areas therein adjacent and on each side of said partitions, said apertured areas cooperating to distribute reaction fluid into the reaction chamber from one manifold and collect products of reaction from the reaction chamber for passage to the other manifold, blocking means for each conduit positioned adjacent at least one of the apertured areas within the reaction chamber for directing the flow of fluid from the conduits through the reaction chamber in extended paths between said partitions.

2. A converter having side and end walls forming an enclosure and partitions extending through the converter providing a reaction chamber disposed between fluid manifolding chambers, means for passing material into and out of said reaction chamber comprising tubular members extending through the reaction chamber and both said manifolding chambers, each tubular member having apertured areas on the outer side of said partitions communicating with the manifolds and apertured areas on the inner side of said partitions communicating with the reaction chamber, said last mentioned apertured areas being positioned adjacent the partitions, blocking means in the tubular members between said last mentioned apertured areas for preventing the passage of material from one manifold through the tubular members to the other manifold.

3. A converter having a reaction chamber adapted to contain contact material and disposed between fluid manifolds, tubular members extending through the reaction chamber and manifolds, each tubular member having perforated areas within the manifolds permitting passage of fluid and preventing the passage of contact material, slotted areas in the portion of the tubular members within the reaction chamber and adjacent the manifolds which are sufficiently large to permit the passage of contact material between the reaction chamber and the tubular members, and a blocking portion disposed in the tubular members between said slotted areas for preventing the passage of material from one manifold through the tubular members to the other manifold.

4. In a converter having a reaction chamber and fluid manifolds adjacent each end, a device for supplying contact material to the reaction chamber and removing it therefrom comprising a tubular member extending through the converter and having perforations in the portions disposed within said fluid manifolds, said perforations being small enough to prevent the passage of contact material between the tubular member and manifold, openings in the portion of the tubular member disposed within the reaction chamber, said openings being positioned adjacent each manifold and being of sufficient size to permit passage of contact material between the reaction chamber and tubular member, and blocking means in the tubular member extending from one of said enlarged apertured areas to the other for directing the contact material from the tubular member into the reaction chamber.

5. A converter for carrying out chemical reactions having partitions extending thereacross providing a reaction chamber adapted to contain contact material and disposed between inlet and outlet fluid manifolding chambers, means for supplying reactants to the inlet manifold and removing reaction products from the outlet manifold comprising a conduit extending through all of said chambers having apertures therein communicating with each of the manifolding chambers and means in a portion of the conduit between said apertures for preventing direct communication between said manifolds through said conduit, a plurality of fluid distributing and collecting conduits extending through the reaction chamber and manifolding chambers, each conduit having apertured areas therein adjacent and on each side of said partitions, said apertured areas cooperating to distribute reaction fluid into the reaction chamber from one manifold and collect reaction products from the reaction chamber for passage to the other manifold, and blocking means for each conduit positioned between the apertured areas within the reaction chamber for preventing the passage of fluid from one manifold directly to the other manifold.

6. A converter having side and end walls forming an enclosure and partitions extending across the converter and secured to the side walls providing end manifolding chambers and a reaction chamber therebetween, apertures in said partitions, heat exchange fluid conduits secured in said end walls and extending loosely through said apertures to permit relative movement between the partitions and said conduits, other apertures in said partitions, reaction fluid conduits secured in said end walls and extending through said other apertures in movable relationship with the partitions, said reaction fluid conduits having an apertured area therein and positioned on the outer side of each partition in communication with a manifold and an apertured area therein and positioned on the inner side of and adjacent each partition in communication with the reaction chamber, blocking means in the reaction fluid conduits between said last mentioned apertured areas to prevent the passage of material through the conduits from one manifold to the other and to direct the passage of material between the manifolds and reaction chamber.

7. In a converter having a reaction chamber for containing contact material and fluid manifolds adjacent each end of the reaction chamber for supplying and removing reactants, a device for selectively passing fluid and contact material to and from the reaction chamber, said device comprising a conduit extending through a manifold and into the reaction chamber and having a slotted area providing communication with the manifold and a slotted area providing communication with the reaction chamber, a hollow slidable insert for said conduit, said insert having perforations and a slotted area therein, some of said perforations being adapted to register with both slotted areas of the conduit when the insert is in one position and others of the perforations and the slotted area being adapted to register with the first and second mentioned conduit slotted areas, respectively, when the position of the insert is adjusted, and blocking means in said conduit for directing material therefrom through the second mentioned conduit slotted area into the reaction chamber.

ROBERT B. VELYKIS.